E. E. AND G. R. COLLAMER.
CONTAINER AGITATING DEVICE.
APPLICATION FILED DEC. 20, 1920.
1,412,774.
Patented Apr. 11, 1922.
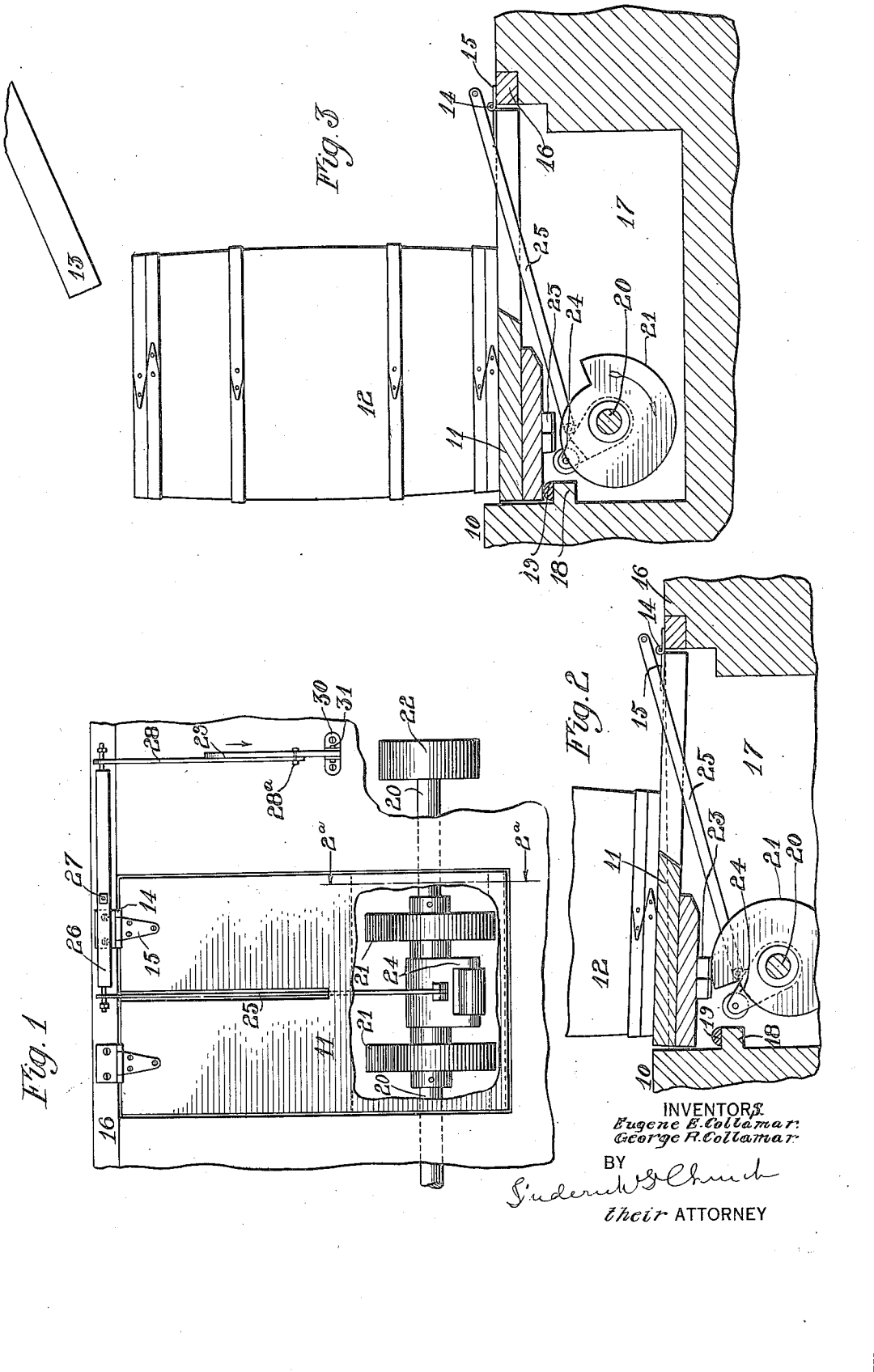
INVENTORS
Eugene E. Collamar
George R. Collamar
BY
their ATTORNEY

UNITED STATES PATENT OFFICE.

EUGENE E. COLLAMER AND GEORGE R. COLLAMER, OF HILTON, NEW YORK, ASSIGNOR OF ONE-THIRD TO J. B. FREY COMPANY, INC., OF ROCHESTER, NEW YORK, A CORPORATION OF NEW YORK.

CONTAINER AGITATING DEVICE.

1,412,774. Specification of Letters Patent. Patented Apr. 11, 1922.

Application filed December 20, 1920. Serial No. 432,054.

*To all whom it may concern:*

Be it known that we, EUGENE E. COLLAMER and GEORGE R. COLLAMER, both citizens of the United States, residing at Hilton, in the county of Monroe and State of New York, have invented certain new and useful Improvements in Container Agitating Devices; and we do hereby declare the following to be a full, clear, and exact description of the same, reference being had to the accompanying drawings, forming a part of this specification, and to the reference numerals marked thereon.

The present invention relates to supports for containers or more especially for barrels for packing and shipping fruit, and to the mechanism for agitating the same in order that the fruit may be packed as tightly as possible and the excess space reduced to a minimum. The object of our invention is to provide a device of the above class which is particularly adapted to prevent injury to or bruising of the fruit, and is so located and arranged as to afford a saving in time in packing, a simplicity of construction and a facility of control or operation. Another object relates to the method employed in accomplishing the above result. To these and other ends the invention consists in certain improvements and combinations of parts, all as will be hereinafter more fully described the novel features being pointed out in the claims at the end of the specification.

In the drawings:

Figure 1 is a top plan view of the container support or platform with a part thereof broken away.

Figure 2 is a section on the line 2ª—2ª of Figure 1, showing a container in place on the platform with the same raised by means of the agitating mechanism.

Figure 3 is a view similar to Figure 2 with the agitating mechanism in another position of its travel.

Similar reference characters throughout the several views indicate the same parts.

In packing apples there is a considerable shrinkage in a barrel due to the fruit drying and this may be reduced to a minimum by tightly packing the same in the barrel or container but during such packing care is necessary to avoid needlessly bruising the fruit. A feature of the present invention is the reduction in the amount of handling of the fruit and container to a minimum.

Referring to the drawings, numeral 10 indicates a floor across which the containers or barrels 12 may be rolled on and off the agitating platform or container support 11, which is preferably disposed adjacent the sorting table or other fruit handling device and beneath the outlet passageway 13 leading therefrom so that the container 12 may be agitated while being filled with fruit. In the illustrated embodiment of our invention the platform 11 is pivotally attached at 14 by the pivot bar or hinges 15, to the stationary support 16. Located in the space 17 beneath the platform is the agitating mechanism and on the wall opposite the hinges is the flange or bearing 18 for the free end of the platform, which bearing is preferably provided with a cushioning surface 19 of rubber or other yieldable material in order to lessen the shock of impact and prevent possible bruising of the fruit contained in the barrel as the same is released and falls upon the cushioned surface 19. The agitating mechanism may comprise a shaft 20 passing substantially transversely of the free end of the platform and on which may be fixed one or more cams 21 driven by the pulley 22, electric motor or other source of power, and disposed beneath the platform so as to contact with the projecting lug 23 or bearing surface on the under side of the platform and gradually raise and suddenly release the same as the cams and shaft are rotated in a clockwise direction shown by the arrow in Figure 3. By the use of two cams disposed as shown in Figure 1, in alinement with the hinges 15 there will be no transverse flexure of the platform and the wear on the pivots 14 is reduced to a minimum. Journalled on the shaft 20 intermediate the cams 21 and centrally of the platform is the spacing or supporting arm 24 which is freely rotatable with respect to the shaft 20 and may, if desired, at its outer end be provided with a roller bearing to cooperate with the lug 23 on the platform and raise the same out of contact with the cams so that the platform may remain stationary for loading or unloading without the necessity of stopping the agitating mechanism. When the platform is thus raised by the arm 24 it should be of substantially the same height or flush with the flooring 10, in order that the container 12 may be rolled on or off the agitating platform with facility. For purposes of manipulating or controlling the spacing member 24, a bar 25 or other member may project through the platform 11 in the rear part thereof out of the way of any barrel carried thereby. The bar 25 engages the lever 26 pivoted, as shown in Figure 1, at 27 which in turn is connected at its opposite end with the link 28 which engages and is pivoted at 28ᵃ to the control handle 29 secured at 31 to the support 30 located adjacent the platform and at the side thereof so that the operator may readily see when the barrel is becoming filled with fruit and then operate the control handle 29 to raise the platform 11 to its stationary position out of contact with the agitating mechanism.

Among the advantages of our invention may be enumerated the fact that the gradual raising of the platform and its cushioned impact after being suddenly released by the cam prevents the occurrence of such jars as might bruise the fruit. The continual agitation of the container while the same is being filled with fruit enables it to be better packed and does away with the necessity of again filling the container with fruit after the same has been agitated. The location of the agitating platform juxtaposed to the sorting table enables the fruit to be packed for shipment at the sorting tables without any intermediate handling. The arrangement of the platform 11 flush with the floor 10 permits the barrels to be readily rolled on or off the platform and the use of the spacing member 24 enables the platform to remain motionless for loading or unloading without the necessity of shutting off the source of power of the agitating means. When the cams are situated in alinement with the hinges, wear on the pivots is reduced to a minimum since no unnecessary lateral bending stresses occur in the platform. The disposition of the spacing member centrally between the cams enables the platform to be raised with its weight evenly distributed on the hinges and the position of the spacing member with one end journalled on the shaft 20 does away with the necessity of providing an additional stationary bearing for this spacing member below the platform.

We claim as our invention:

1. The combination with a support for a container, of a mechanism for agitating said support, a pivot bar for guiding said support and means for bodily separating the support and mechanism to permit operation of the mechanism independently of the support.

2. The combination with a container support, of mechanism for gradually moving said support away from its normal position and permitting a return of the same, a pivot bar on one side of said support for guiding the same, and a cushioning device located opposite said pivot bar to lessen the impact of said support on its return.

3. The combination with a handling floor for containers, of an agitatable container platform, a mechanism below said platform to agitate the same, and a spacing member movable to raise the platform out of contact with said mechanism, said platform when supported by the spacing member being substantially flush with the floor.

4. The combination with a container platform, of a plurality of hinges secured to one side thereof and about which said platform is pivoted, a rotative shaft substantially parallel with said hinges and beneath the opposite end portion of said platform, a plurality of cams on the shaft, symmetrically disposed with regard to the longitudinal axis of the platform, and adapted to cooperate with the same, a spacing arm journalled on the shaft centrally of the platform and adapted to be moved about said shaft to raise the platform out of engagement with the cams, and a control member above the platform and operatively connected with said spacing arm.

5. The combination with a sorting device for fruit, of an outlet passageway therefrom for the fruit, a container platform beneath said passageway, a rotative shaft below the platform, a cam on said shaft adapted to gradually raise and suddenly release the platform, a yieldable or cushioning element in cooperation with the platform to lessen its impact after the release thereof, a spacing member adapted to raise the platform out of engagement with the cam, a control member operatively connected with the spacing member and extending above the platform, and a container handling floor adjacent and substantially flush with the platform when the same is raised by the spacing member out of engagement with the cam.

6. The combination with a handling floor having a pit therein, of a container platform covering the pit and hinged to the floor at one side of the pit, and agitating mechanism arranged in the pit to cooperate with the platform and vibrate it upon its hinge.

7. The combination with a handling floor having a pit therein, of a container platform covering the pit and hinged to the floor at one side of the pit, agitating mechanism arranged in the pit to cooperate with the platform and vibrate it upon its hinge and means for raising the platform out of cooperative relationship with the agitating mechanism to an inoperative position in which it is substantially flush with the handling floor.

EUGENE E. COLLAMER.
GEORGE R. COLLAMER.